US 6,621,849 B1

(12) United States Patent
Thro et al.

(10) Patent No.: US 6,621,849 B1
(45) Date of Patent: Sep. 16, 2003

(54) OPTICAL PUMPING MODULE FOR A LASER COMPRISING A CYLINDRICAL REFLECTOR WITH A POLYGONAL BASE

(75) Inventors: Pierre-Yves Thro, Gif-sur-Yvette (FR); Gilles Ughetto, Montigny (FR)

(73) Assignee: Commissariat a l'Energie Atomique, Paris (FR)

(*) Notice: Subject to any disclaimer, the term of this patent is extended or adjusted under 35 U.S.C. 154(b) by 0 days.

(21) Appl. No.: 09/926,212

(22) PCT Filed: Mar. 23, 2000

(86) PCT No.: PCT/FR00/00734

§ 371 (c)(1),
(2), (4) Date: Sep. 25, 2001

(87) PCT Pub. No.: WO00/60709

PCT Pub. Date: Oct. 12, 2000

(30) Foreign Application Priority Data

Mar. 30, 1999 (FR) .............................. 99 03946

(51) Int. Cl.⁷ ............................. H01S 3/08; H01S 3/07; H01S 3/091
(52) U.S. Cl. .............................. 372/99; 372/66; 372/70
(58) Field of Search ................. 372/38.06, 72, 372/99, 107, 66

(56) References Cited

U.S. PATENT DOCUMENTS

| | | | | |
|---|---|---|---|---|
| 4,093,924 A | * | 6/1978 | Farcy | 330/4.3 |
| 4,715,713 A | * | 12/1987 | Hutchings | 356/350 |
| 4,740,983 A | * | 4/1988 | Azad | 372/66 |
| 4,945,547 A | * | 7/1990 | Greene | 372/94 |
| 5,140,607 A | * | 8/1992 | Paiva | 372/70 |
| 5,570,387 A | * | 10/1996 | Carriere et al. | 372/50 |
| 5,852,626 A | * | 12/1998 | Reed | 372/103 |

OTHER PUBLICATIONS

H.-J. Moon, et al., Applied Optics, vol. 38, No. 9, pp. 1772–1776, "Efficient Diffusive Reflector–Type Diode Side–Pumped Nd:YAG Rod Laser with an Optical Slope Efficiency of 55%", Mar. 20, 1999.
Patent Abstracts of Japan, JP 10–022551, Jan. 23, 1998.
Y. Hirano, et al., OSA Technical Digest—Conference on Lasers and Electro–Optics (CLEO '98), vol. 6, pp. 103–104, "High–Average–Power Conductive–Cooled Diode–Pumped Nd:YLF Laser", 1998.
K. Du, et al., Applied Optics, vol. 37, No. 12, pp. 2361–2364, "Neodymium:YAG 30–W cw Laser Side Pumped by Three Diode Laser Bars", Apr. 20, 1998.
S. Fujikawa, et al., OSA Tops, vol. 10, pp. 296–299, "High–Power High–Efficient Diode–Side–Pumped Nd: YAG Laser", 1997.
T. Brand, et al., Opt.Lett., CLEO Europe 96, vol. 20, 1 page, "Design and Performance of a Compact 600W cw Nd:YAG Rod Laser System Pumped by Microchannel–Cooled Stacked Diode Laser Arrays", 1995.

* cited by examiner

Primary Examiner—Paul Ip
Assistant Examiner—Phillip Nguyen
(74) Attorney, Agent, or Firm—Oblon, Spivak, McClelland, Maier & Neustadt, P.C.

(57) ABSTRACT

An optical pumping module for a laser including an amplifying medium forming a bar with a circular base, at least one light source for optical pumping of the amplifying medium, and a reflector that surrounds the amplifying medium to send the light, along several passes, towards the amplifying medium and forming a cylinder with a polygonal base. The light source is placed in front of one edge of this cylinder on the opposite side of this edge from the amplifying medium. The optical pumping module may be particularly applicable to laser cutting and welding.

22 Claims, 2 Drawing Sheets

OPTICAL PUMPING MODULE FOR A LASER COMPRISING A CYLINDRICAL REFLECTOR WITH A POLYGONAL BASE

TECHNICAL DOMAIN

This invention relates to an optical pumping module for a laser comprising a cylindrical reflector with a polygonal base.

A laser based on the invention can be used for industrial applications, particularly for cutting, welding, surface hardening materials and for marking of objects.

It may also be used for applications in the medical domain.

STATE OF PRIOR ART

It is known that a laser essentially comprises an amplifying medium and two mirrors forming a resonant cavity, the amplifying medium being placed between these two mirrors.

The energy necessary for operation of a laser may be supplied electrically, chemically or optically to the amplifying medium.

In this invention, we are interested in the third manner, in other words what is called optical pumping of the amplifying medium, and more precisely transverse optical pumping of this amplifying medium.

In order to reduce effects that limit laser performances, it is important to distribute pumping light in the amplifying medium as uniformly as possible.

If nothing is done, the distribution of this pumping light is usually non-homogenous and often has a maximum at the source of this light.

The invention relates to a means of making this distribution homogenous and its advantages over existing techniques are the simplicity of implementation and construction, and therefore lower cost.

It is known that the amplifying medium of a laser absorbs all or some of the pumping power and that a given quantity is re-emitted in the form of a stimulated emission, the rest of the absorbed power being transformed into heat. This stimulated emission is called the "laser effect".

Absorption of the pumping power follows an exponential law (Beer-Lambert's law) that is translated by a higher power being absorbed on the part(s) of the amplifying medium close to the pumping source. This creates pumping non-homogeneities; the power absorbed is not the same at all points in the amplifying medium.

Variations in pumping at different points in the amplifying medium also create local variations in the refraction index that result in deformation of the phase of the emitted laser beam.

The final consequence of this pumping non-homogeneities is a limitation to the quality of this laser beam. In particular, the deformation of the phase limits the extracted power and increases the divergence of the laser beam.

One known method of overcoming these disadvantages is to choose an amplifying medium that is a relatively poor absorber at the wavelength of the pumping radiation and a reflector capable of redirecting the pumping radiation that was not absorbed in the first pass, to the amplifying medium. After several passes through the amplifying medium, the pumping radiation is eventually fully absorbed.

Usually, known reflectors have a curved surface, with a length approximately the same length as the amplifying medium in order to reconcentrate unabsorbed power towards the amplifying medium.

Reflectors with curved surface are described in the following documents:

T. Brand, I. Schmidt, "Design and performance of a compact 600 W cw Nd:YAG rod laser system pumped by microchannel-cooled stacked diode laser arrays", CMA2, CLEO Europe 96

S. Fujikawa, T. Kojima and K. Yasui, "High-power high efficient diode-side-pumped Nd:YAG laser", published by C. R. Pollock and W. Bodsenberg, OSA TOPS vol. 10, pp. 296–299.

K. Du et al., "Neodymium:YAG 30-W cw laser side pumped by three diode laser bars", Appl. Opt., Vol. 37, No. 12, Apr. 20, 1998, pp. 2361–2364.

A reflector is usually machined from a metallic part that is then polished (to obtain an optical quality polish) and coated with a reflecting layer made of gold, silver or aluminium. The quality of the reflector is better when the polishing quality is better.

Curved concave surfaces with low radii of curvature (as for the surfaces considered in this case) are difficult to polish correctly. Similarly, it is difficult to apply the reflecting layer uniformly.

Reflectors may also be machined from diffusing materials such as some ceramics or some PTFE (Teflon [registered trademark]).

The disadvantage of these materials is their bad thermal conductivity that makes dissipation of heat generated by residual absorption of these materials more difficult. Since they are also porous, their use sometimes requires an additional treatment (enamelling) when they come into direct contact with a cooling fluid.

Another technique for making reflectors consists of compressing a diffusing powder (for example MgO powder or $BaSO_4$ powder) in the space between two pieces of quartz.

This type of reflector may be long, difficult and expensive to make.

The amplifying medium of a laser may usually be considered as a convergent lens with regard to the pumping light source. This is the case particularly for the very frequent configuration of a solid amplifying medium forming a cylindrical bar with a circular base.

This is illustrated by FIG. 1 that shows a diagrammatic cross-sectional view of such an amplifying medium perpendicular to the X-axis of the bar.

If a reflecting plane 2 and the pumping light source 4 are placed facing each other on opposite sides of the amplifying medium 6, the pumping beam 8 will be refocused on or close to this amplifying medium.

This has the disadvantage that it makes the pumping non-homogeneous in the amplifying medium.

This type of disadvantage exists for the reflector with a polygonal cross-section described in the document by:

Y. Hirano et al., "High-average-power conductive-cooled diode-pumped Nd:YLF Laser", Conference on Lasers and Electro-optics, vol. 6, 1998, OSA Technical Digest Series (OSA Washington D.C., 1998), pp. 103–104 in which the optical pumping light sources (laser diodes) are facing the reflector planes.

DESCRIPTION OF THE INVENTION

The purpose of this invention is to overcome this disadvantage of non-homogeneity of the optical pumping.

Its purpose is a laser optical pumping module, this module comprising an amplifying medium forming a cylindrical bar with an approximately circular base, at least one light source provided for transverse optical pumping of this medium, and a reflector that surrounds this medium and that is designed to send the light from the source along several passes towards the amplifying medium in order to homogenize pumping of the medium, this reflector forming a cylinder, the base of which is an approximately regular polygon to create several image point-sources by a kaleidoscope effect, the edges of this cylinder being parallel to the axis of the amplifying medium, this module being characterized in that the light source is facing one edge of this cylinder opposite this edge with respect to the amplifying medium, the distance between this medium and this source being chosen to optimise the homogenisation effect of optical pumping.

According to a preferred embodiment of the module according to the invention, the amplifying medium and the reflector are approximately coaxial. This thus facilitates manufacturing of this module.

Preferably, the length of the reflector is approximately the same as the length of the amplifying medium. This means that the entire length of this amplifying medium can be used for optical pumping.

According to a first particular embodiment of the module according to the invention, the number of faces on the reflector is odd and the light source is at approximately the same level as and in the middle of a face of this reflector.

According to a second particular embodiment, the number of faces on the reflector is even and the light source is approximately on one edge of this reflector.

The module according to the invention may also comprise several blocks, each block comprising at least one plane face capable of reflecting the light from the source, each face of the reflector being formed by at least one of the plane faces of the blocks.

According to a particular embodiment of the module, the light source is placed in an interval formed between two of the blocks such that light emerges from the space thus formed between the plane faces of these two blocks.

According to a first particular embodiment of the invention, the light source is a light emitter.

This light emitter may comprise a laser diode or a strip of laser diodes or a row of strips of laser diodes, or a stack of strips of laser diodes, or a combination of these two geometries, this or these strips being parallel to the axis of the cylinder formed by the reflector. When the light emitter comprises several superposed diode strips, the space between two strips preferably remains small.

In this case in which the emitter comprises a laser diode or one or more strips of laser diodes, when the light source is placed in the interval formed between the two blocks, the two blocks may be electrically conducting, the laser diode or the strip(s) of laser diodes then being electrically powered through these two blocks.

According to a second particular embodiment of the module, each light source is a light propagation means, the first end of which is intended to illuminate the amplifying medium and the second end of which is intended to receive the light from a light emitter.

BRIEF DESCRIPTION OF THE DRAWINGS

This invention will be better understood after reading a description of the example embodiments given below, for information only and in no way restrictive, with reference to the attached drawings on which.

DETAILED DESCRIPTION OF PARTICULAR EMBODIMENTS

Figure 2:
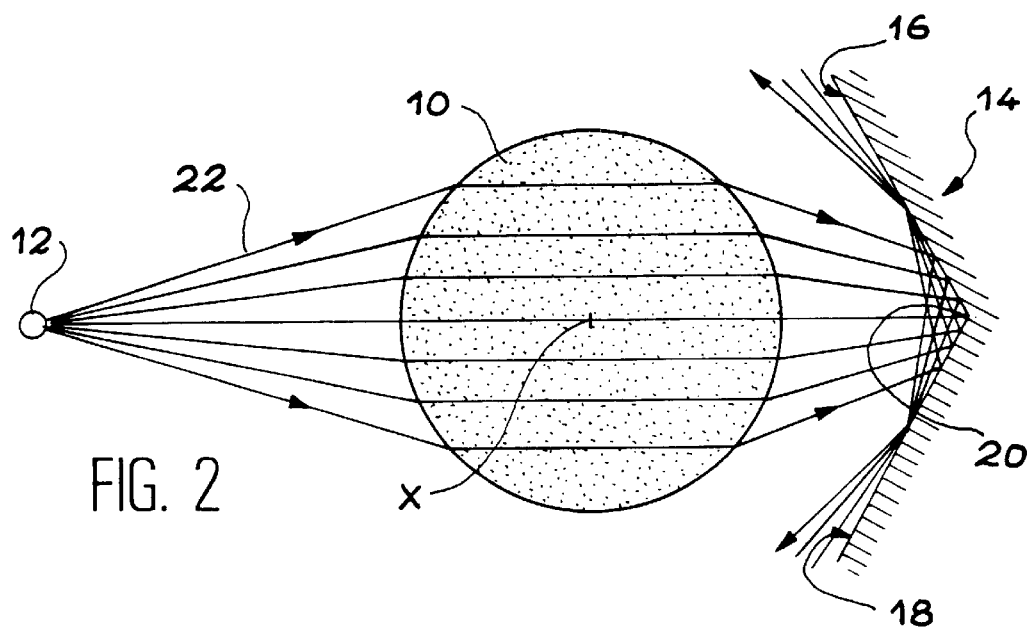

An optical pumping module according to the invention is diagrammatically and partially shown in FIG. 2, and comprises an amplifying medium 10 forming a cylindrical bar, the base of which is circular or approximately circular and the axis of which is denoted X.

This module also comprises a light source 12 intended for transverse optical pumping of the medium 10.

Furthermore, this module comprises a reflector 14 forming a cylinder, the base of which is a regular or approximately regular polygon.

This cylinder is an assembly of several polished plane faces possibly coated with a reflecting or diffusing layer. Only two adjacent faces 16 and 18 are shown in FIG. 2.

The intersections of the planes of the faces of the cylinder form the edges of this cylinder and FIG. 2 shows the edge 20 corresponding to faces 16 and 18.

The edges of the cylinder are parallel to the X-axis of the medium in the form of a bar. Note that FIG. 2 is a cross-sectional view of the module perpendicular to this X-axis.

According to the invention, the pumping light source 12 is placed facing the edge 20 of the cylinder, at the opposite end of this edge with respect to the bar shaped medium 10.

This configuration is useful for creating multiple image point-sources of the source 12 by kaleidoscope effect.

Reference 22 in FIG. 2 shows the light beam emitted by this source 12.

With the configuration considered, the pumping light that is not absorbed during a first pass through the amplifying medium 10, is reflected on the corner of the reflector that faces the source 12 (in other words is reflected near the edge 20) and is therefore not refocused towards the amplifying medium 10.

Preferably, as shown in FIG. 2, the source 12 is in the plane containing the X-axis of this amplifying medium and the edge 20 of the reflector. This simplifies manufacturing of the module according to the invention.

Note that compared with a pumping module comprising a reflector with a curved surface, the invention has the advantage that it comprises plane faces that are easier to machine, polish satisfactorily and treat than a curved surface.

With a module according to the invention, a very uniform pumping distribution can be obtained taking care to place the pumping light source(s) at an appropriate distance from the amplifying medium.

This distance depends mainly on the divergence of the pumping beam(s) supplied by this or these sources.

The source(s) must not be too close to the amplifying medium to illuminate the medium as broadly as possible, and must not be too far away from this amplifying medium so that it (they) does not reduce the efficiency of the laser by reducing the pumping power absorbed during the first pass of the pumping light.

Figure 3:
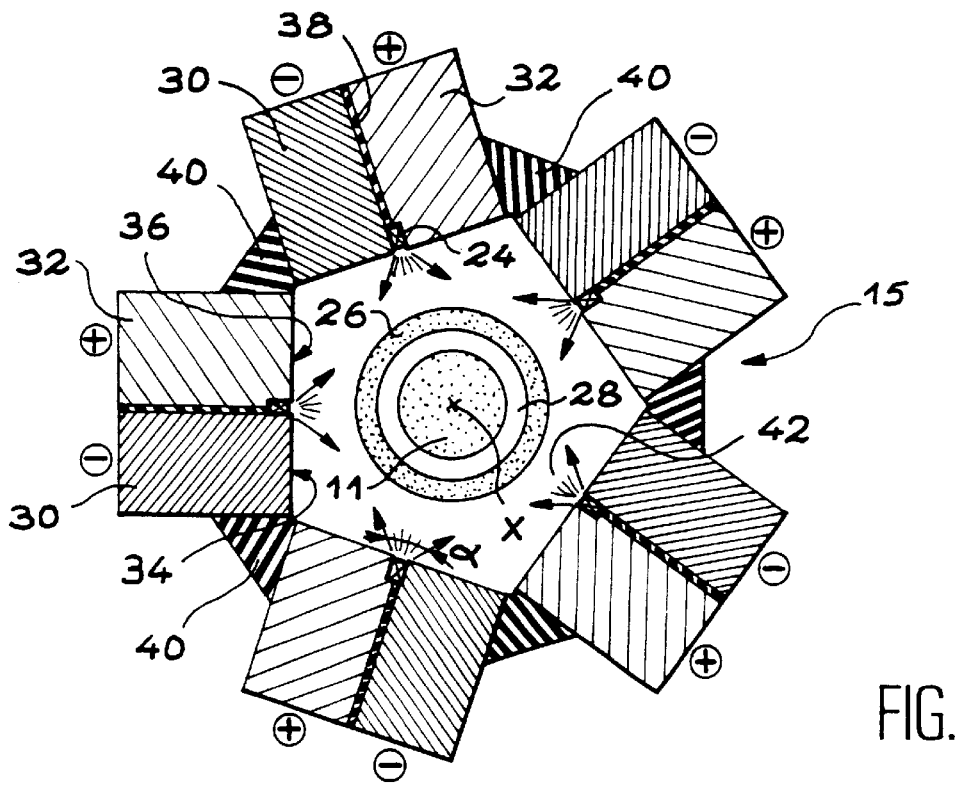
FIG. 3 is a diagrammatic cross-sectional view of a particular embodiment of the optical pumping module according to the invention, using a cylindrical reflector with a polygonal base with an odd number of faces.
Figure 4:
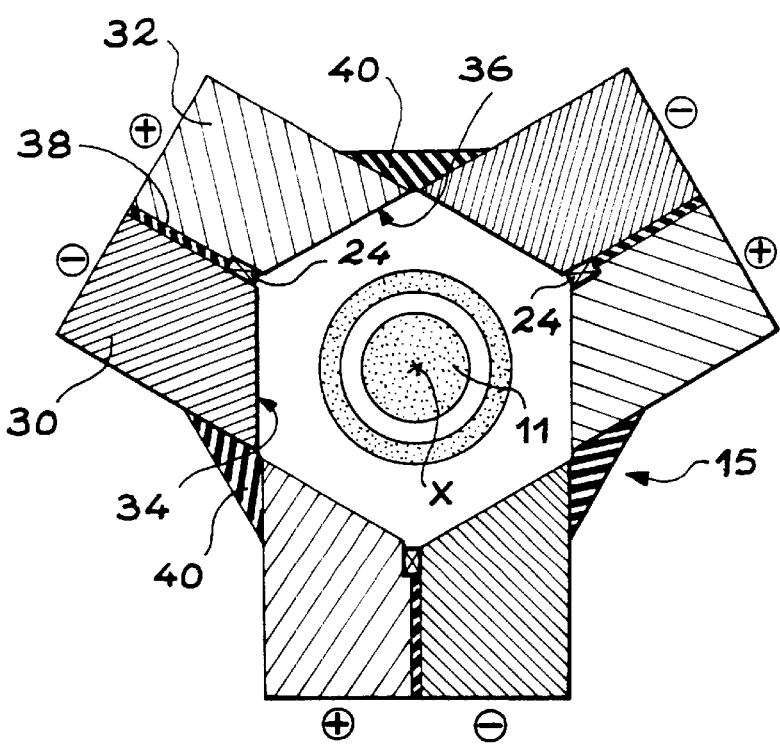
FIG. 4 is a diagrammatic cross-sectional view of another particular embodiment of the optical pumping module according to the invention, using a cylindrical reflector with a polygonal base with an even number of faces.

We will now consider the examples in FIGS. 3 and 4 in which a cylindrical reflector 15 with a polygonal base and an amplifying medium 11 in the form of a cylindrical bar with a circular base are coaxial and are approximately the same length.

In each of these examples, the pumping module is seen in a cross-sectional view perpendicular to the X-axis that is common to the amplifying medium and the reflector.

In the example shown in FIG. 3, the reflector comprises an odd number of faces (more precisely 5 faces) and the pumping light source consists of light emitters composed of strips of laser diodes 24 parallel to the X-axis.

Note that the two mirrors in the laser cavity are not shown in FIG. 3 (nor on the other figures). These mirrors, that delimit this cavity, are perpendicular to the X-axis and are placed on each side of the amplifying medium.

In the example shown in FIG. 3, this amplifying medium 11 is solid. It is located inside a tube 26 that is transparent to the pumping light.

In the interval 28 between this tube 26 and the amplifying medium 11, a cooling liquid such as water is circulated by means not shown to cool the amplifying medium.

FIG. 3 shows five groups of two metallic blocks 30 and 32 with two plane faces 34 and 36 respectively that are coplanar and the assembly of which forms one of the faces of the reflector 15 with a pentagon-shaped base of the module in FIG. 3, which is the reason for the five faces of this reflector.

Each strip of laser diodes 24 is included between the two metallic blocks of the same group and is close to the faces 34 and 36 of these two blocks, on the line separating these two faces.

This enables the electric power supply of the laser diodes of this strip 24 by polarizing the two blocks in an appropriate manner using means shown symbolically in FIG. 3 by the − and + signs associated with blocks 30 and 32 respectively.

FIG. 3 shows the space between these two blocks 30 and 32, that is partially occupied by the corresponding strip 24. The rest of this space is filled with an electrically insulating material 38.

Similarly, an element 40 made from an electrically insulating material separates each block 30 belonging to a given group of blocks in the adjacent group, to avoid electrical contact between these two blocks.

Furthermore, all faces 34 and 36 are polished (optical quality polishing) and coated with a reflecting metallic deposit (not shown) that for example may consist of a layer of gold.

The pumping light beam 42 output from each laser diode, and that diverges by about an angle a is equal to about 90° in the example considered, is directed towards the amplifying medium 11 and a portion of this beam penetrates into this amplifying medium 11 in which it is partly absorbed.

Light that does not penetrate into this medium or that is not absorbed during the first pass through it is reflected by the gold layer.

After a large number of reflections, the pumping light is completely absorbed either by the amplifying medium or by the gold layer.

The module in FIG. 4 is different from the module in FIG. 3 by the number of faces in its reflector 15; this number is even and is equal to six in the example shown, which is why it has a cylindrical reflector with a hexagonal base.

In the example shown in FIG. 4, three groups of two blocks 30 and 32, and therefore three series of strips of laser diodes 24, are used, each strip being located on the edge common to the two plane faces of the same group.

Each face of the reflector with a hexagonal base is composed of a plane face of one of the blocks and the angle between the plane faces of the two adjacent blocks is equal to 120°.

Considering the example shown in FIG. 3. again, the number of strips of laser diodes may be less than 5 and may even be equal to 1. This number depends on the power required for the corresponding laser.

Thus, blocks 30 and 32 in a particular group that is not associated with a strip may all be in contact with each other (without any space between them) and only each group of blocks associated with a strip must be separated from the adjacent groups by elements made of an electrically insulating material 40.

Figure 1:
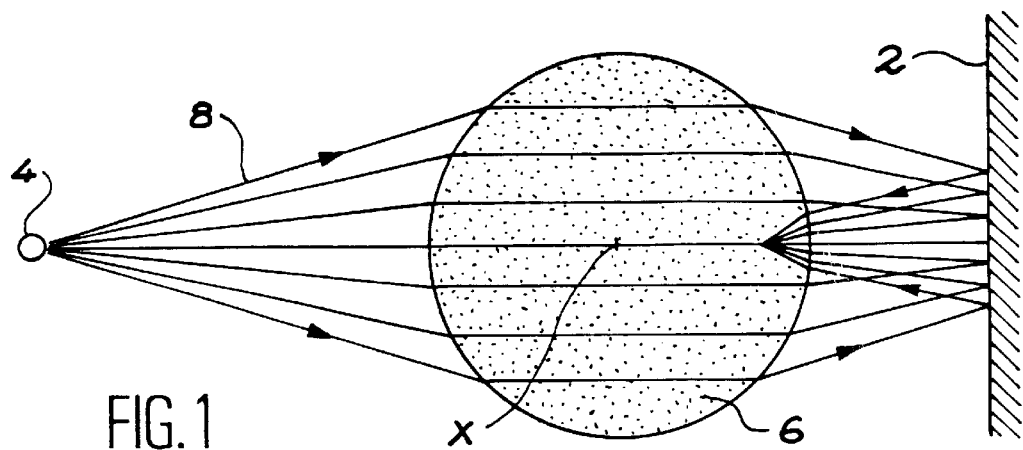
FIG. 1 diagrammatically illustrates the principle of a known optical pumping module that has already been described, FIG. 2 diagrammatically illustrates the principle of this invention.

Similarly, the module in FIG. 1 can only comprise one or two strips of laser diodes.

In the case shown in FIG. 4, it will even be possible to add a strip of laser diodes at each insulating element 40 located on the opposite side of the X-axis from an existing strip, requiring an additional three strips.

Furthermore, each strip of laser diodes in the examples given with reference to FIGS. 3 and 4 may be replaced by a single laser diode if a high power laser is not necessary, or on the other hand by several superposed strips, or may be aligned along a row, or a combination of these two geometries may be used.

The examples in FIGS. 3 and 4 show pumping light emitters to add this light directly into the space delimited by the reflector.

Alternatively, this light can be introduced through light propagation means such as the following:

dioptric systems (combinations of lenses), catoptric systems (using mirrors) in the space delimited by the reflector to hold pumping beams parallel to the X-axis of the amplifying medium, these mirrors being oriented so as to direct these beams perpendicular to this axis towards the amplifying medium, catadioptric systems (combinations of lenses and mirrors) and light guides.

Figure 5:
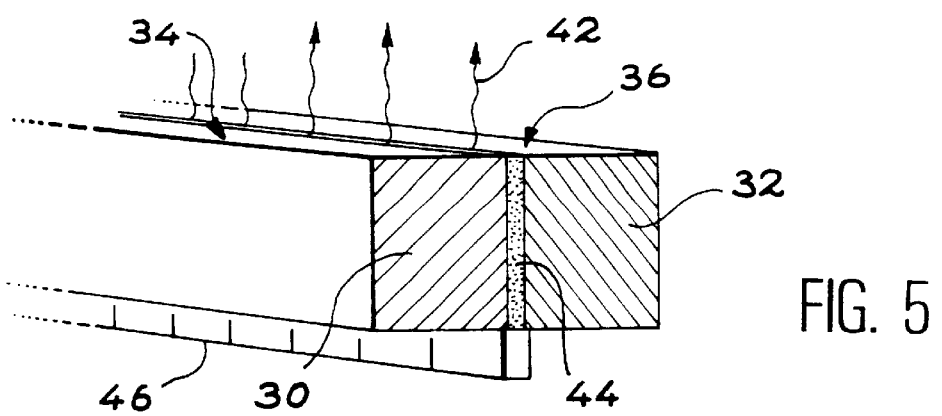
FIG. 5 is a diagrammatic and partial perspective view of a variant embodiment of the module in FIG. 3.

This is illustrated in FIG. 5 in which a variant of FIG. 3 is diagrammatically and partially shown as a perspective view.

This figure shows one of the groups of two blocks 30 and 32 between which a glass plate 44 is inserted.

The first end of this glass plate 44 is adjacent to faces 34 and 36 of these blocks 30 and 32.

The second end of this plate 44 is optically coupled to a strip of laser diodes 46 that is controlled by means not shown.

This strip emits pumping light 42 that is then transported by the plate 44 and exits through the first end of this plate to illuminate the amplifying medium (not shown).

What is claimed is:

1. Laser optical pumping module, comprising:

an amplifying medium forming a cylindrical bar with an approximately circular base;

at least one light source provided for transverse optical pumping of the medium; and a reflector surrounding the medium and configured to reflect light from the at least one light source toward the medium along several passes to homogenize pumping of the medium, the reflector forming a cylinder, the base of which is a substantially regular polygon to create several image point-sources by a kaleidoscope effect, edges of the cylinder being parallel to a centerline axis of the medium, wherein the at least one light source is placed in front of one edge of the cylinder on an opposite side of the one edge from the medium, a distance between the medium and the at least one light source being configured to optimize the homogenization effect of optical pumping.

2. Module according to claim 1, in which the amplifying medium and the reflector are substantially coaxial.

3. Module according to claim 1, in which a length of the reflector is approximately a same length as a length of the amplifying medium.

4. Module according to claim 1, in which a number of faces on the reflector is odd and the at least one light source is at approximately a middle of a face of the reflector.

5. Module according to claim 1, in which a number of faces on the reflector is even and the at least one light source is approximately on one edge of the reflector.

6. Module according to claim 1, further comprising plural blocks, each block comprising at least one plane face configured to reflect the light from the light source, each face of the reflector being formed by at least one of the plane faces of the blocks.

7. Module according to claim 6, in which the at least one light source is placed in an interval formed between two of the blocks such that a light emerges from the space thus formed between the plane faces of the two blocks.

8. Module according to claim 1, in which the light source includes a light emitter.

9. Module according to claim 8, in which this light emitter comprises at least one of a laser diode or a strip of laser diodes, a row of strips of laser diodes, and a stack of strips of laser diodes, parallel to an axis of the cylinder formed by the reflector.

10. Module according to claim 7, in which the light source includes a light emitter and the light emitter comprises at least one of a laser diode, a strip of laser diodes, a row of strips of laser diodes, and a stack of strips of laser diodes, parallel to an axis of the cylinder formed by the reflector, and in which the two blocks are electrically conducting and the laser diode, the strip, the row, or the stack is electrically powered through the two blocks.

11. Module according to claim 1, in which the light source is a light propagation means, a first end of which is configured to illuminate the amplifying medium and a second end of which is configured to receive light from a light emitter.

12. A laser optical pumping module, comprising:
an amplifying medium;
a light source;
a plurality of reflectors; and
a plurality of insulators configured to be positioned between each of the plurality of reflectors, wherein the amplifying medium is shaped as a cylindrical bar having a substantially circular base, wherein the light source is configured to provide light for optically pumping the amplifying medium, wherein the reflector is configured to reflect light from the light source toward the amplifying medium, thereby homogenizing pumping of the amplifying medium, and the reflector is shaped as a cylinder having a base shaped as an approximately regular polygon, edges of the cylinder being parallel to a centerline axis of the amplifying medium, wherein the light source is placed in front of one edge of the cylinder on an opposite side of the one edge from the amplifying medium, a distance between the amplifying medium and the light source being chosen to optimize homogenized pumping of the amplifying medium.

13. Module according to claim 12, in which the amplifying medium and the reflector are substantially coaxial.

14. Module according to claim 12, in which a length of at least one of the plurality of reflectors is approximately a same length as a length of the amplifying medium.

15. Module according to claim 12, in which a number of faces on the plurality of reflectors is odd and the light source is at approximately a middle of a face of each of the plurality of reflectors.

16. Module according to claim 12, in which a number of faces on the plurality of reflectors is even and the light source is approximately on one edge of each of the plurality of reflectors.

17. Module according to claim 12, further comprising plural blocks, each block comprising at least one plane face configured to reflect the light from the light source, each face of the reflector being formed by at least one of the plane faces of the blocks.

18. Module according to claim 12, in which the light source is placed in an interval formed between two of the blocks such that a light emerges from the space thus formed between the plane faces of the two blocks.

19. Module according to claim 12, in which the light source includes a light emitter.

20. Module according to claim 19, in which this light emitter comprises at least one of a laser diode or a strip of laser diodes, a row of strips of laser diodes, and a stack of strips of laser diodes, parallel to an axis of the cylinder formed by the reflector.

21. Module according to claim 18, in which the light source includes a light emitter and the light emitter comprises at least one of a laser diode, a strip of laser diodes, a row of strips of laser diodes, and a stack of strips of laser diodes, parallel to an axis of the cylinder formed by the reflector, and in which the two blocks are electrically conducting and the laser diode, the strip, the row, or the stack is electrically powered through these two blocks.

22. Module according to claim 12, in which the light source includes a light propagation means having a first end configured to illuminate the amplifying medium and a second end configured to receive light from a light emitter.

* * * * *